(12) United States Patent
Gauronski et al.

(10) Patent No.: US 8,208,154 B2
(45) Date of Patent: Jun. 26, 2012

(54) INTERMEDIATE JOB TERMINATION RESPONSE

(75) Inventors: Jefferey J. Gauronski, Penfield, NY (US); Valerie K. Parcero, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1117 days.

(21) Appl. No.: 11/736,917

(22) Filed: Apr. 18, 2007

(65) Prior Publication Data

US 2008/0262656 A1    Oct. 23, 2008

(51) Int. Cl.
*H04N 1/00* (2006.01)
(52) U.S. Cl. ................................. 358/1.15; 358/1.14
(58) Field of Classification Search .............. 358/1.14, 358/1.15; 399/43, 76, 82
See application file for complete search history.

(56) References Cited

U.S. PATENT DOCUMENTS

| 5,206,735 | A | 4/1993 | Gauronski et al. |
| 5,839,045 | A | 11/1998 | Wierszewski |
| 5,933,679 | A | 8/1999 | Palumbo |
| 6,069,704 | A * | 5/2000 | Verhaag ................... 358/1.12 |
| 2003/0020944 | A1* | 1/2003 | Bhogal et al. ............. 358/1.15 |
| 2007/0014614 | A1* | 1/2007 | Yoshida ..................... 400/62 |

* cited by examiner

*Primary Examiner* — Dov Popovici
*Assistant Examiner* — Kent Yip
(74) *Attorney, Agent, or Firm* — Oliff & Berridge, PLC

(57) ABSTRACT

A method to increase productivity on digital production press machines following an interrupt job includes sending an expected termination point with continuation data back to a digital front end when the machine terminates the original job, as opposed to waiting until the last schedule sheet exits the machine. In this manner, the digital front end may resubmit the continuation of the original job sooner, thus reducing or eliminating the skipped pitches. Final termination information is determined and compared to the continuous data. If there is a discrepancy, the machine may cycle down and recalculated to ensure job integrity.

19 Claims, 3 Drawing Sheets

INTERMEDIATE JOB TERMINATION RESPONSE

BACKGROUND

The exemplary embodiments generally relate to xerographic marking devices, and specifically relate to controls and media handling for interrupt jobs.

Productivity is lost when running a small print job as an interrupt job in the middle of a large job on a digital production press. This is due to the need to have the currently printing job be terminated prior to being able to resubmit that job from the point the machine left off. For example, suppose the digital production press is performing a printing job that is composed of 100 books, each book consisting of 200 sheets, for a total of 20,000 sheets to print. Such a printing job takes a long time to complete. Often, it is desirable to submit a small proof job related to a future printing job, while the large printing job is still running. Once the proof job is printed, editing can be continued on the future job that will later be printed in large quantities. Another example is printing mass mailings, where one large job may be printing, but it is desired to interrupt the large job for small proof jobs without holding up the large job for too long. For printing jobs such as books or mass mailings, even small delays may result in lost profits or lost opportunities. In the fast-paced business world, sometimes it is necessary to interrupt even medium or small jobs with an interrupt job and it can be frustrating if there are any delays while waiting for the interrupt job to be processed.

SUMMARY

Exemplary embodiments include various aspects of a method to increase productivity on a xerographic machine (e.g., a digital production press) following an interrupt job. Currently, if the machine receives a small job interrupt during a job that is already running, the machine terminates the current job and inserts the interrupt job, without skipping any pitches. However, it is not until after the scheduled sheets of the current job have completed printing that the termination information for the current job is sent back to the digital front end with continuation data. Once the digital front end receives the continuation data, the original job is resubmitted and picked up where it left off. One problem is the paper path is now empty and productivity is lost. The solution involves sending an expected termination point with continuation data back to the digital front end when the machine terminates the original job as opposed to waiting until the last schedule sheet exits the machine. In this manner, the digital front end may resubmit the continuation of the original job sooner, thus eliminating the skipped pitches. Final termination information is determined and compared to the continuous data. If there is a discrepancy, the machine may cycle down and recalculates to ensure job integrity.

One aspect is a method of intermediate job termination. An expected termination point, Y, of a main job is calculated, upon submission of an interrupt job. The main job is resubmitted to print after completion of the interrupt job starting at Y+1. The main job is printed up to Y and the whole interrupt job is printed. Printing of the main job resumes at Y+1 without any pause following the last sheet of the interrupt job. There may be no skipped pitches between the last sheet of the interrupt job and next sheet resuming the main job. A print station may calculate the expected termination point, Y, of the main job and send Y as intermediate continuation data to a digital front end. The print station may also send the actual termination point as final continuation data to the digital front end. The digital front end receives the expected termination point of the main job, before the main job reaches the expected termination point. The print station may compare the actual termination point with the expected termination point and cause a fault to be raised, if they are different. Another aspect is a computer-readable medium storing instructions for performing this method of intermediate job termination.

Yet another aspect is a xerographic machine, including a feeder, a marker, a stacker, and a print station. At least one feeder feeds sheets onto a paper path, the marker marks images on the sheets on the paper path and the stacker stacks the marked sheets on the paper path. The print station calculates an expected termination point, Y, of a main job, upon submission of a interrupt job. The print station sends Y as intermediate continuation data to a digital front end and sends an actual termination point as final continuation data to the digital front end. The digital front end receives the expected termination point of the main job, before the main job reaches the expected termination point. Resuming printing the main job at Y+1 following a last sheet of the interrupt job occurs with no pause between the last sheet of the interrupt job and the Y+1 sheet of the main job. The print station may compare the actual termination point with the expected termination point and raise a fault message if they differ.

DETAILED DESCRIPTION OF EMBODIMENTS

While a main job A is printing, a user wants to proof job B, which is one copy or one sheet, and the user submits proof job B as a job interrupt. Exemplary embodiments create an intermediate termination based on the expected point of job completion of a main job when an interrupt job is submitted. One exemplary embodiment is a method of an intermediate job termination response that allows better productivity by enabling the main job to be resubmitted right away after the interrupt job so that printing continues without skipping any pitches. Without this exemplary embodiment, when the above situation occurs, job A is terminated but the machine continues printing sheets that are already scheduled. Proof job B is printed following the last scheduled sheet of job A. As job A's scheduled sheets are finally completed, the termination information is sent back to the digital front end with continuation data. Once the digital front end receives the continuation data, job A is resubmitted and starts printing. Unfortunately, most of the paper path is then empty, causing lost productivity. This exemplary embodiment reduces or eliminates that lost productivity. When job A is terminated, an expected termination point is used to send a response to the digital front end containing continuation data. The digital front end uses that to continue the job interrupt process by resubmitting job A with the continuation point after proof job B is submitted. This enables proof job B to print without any skipped pitches. Final termination information is calculated once the sheets have printed and is compared to the intermediate continuation data. If the intermediate continuation data is different, the printing system may cycle down and recalculate where to continue to ensure job integrity.

Figure 1:
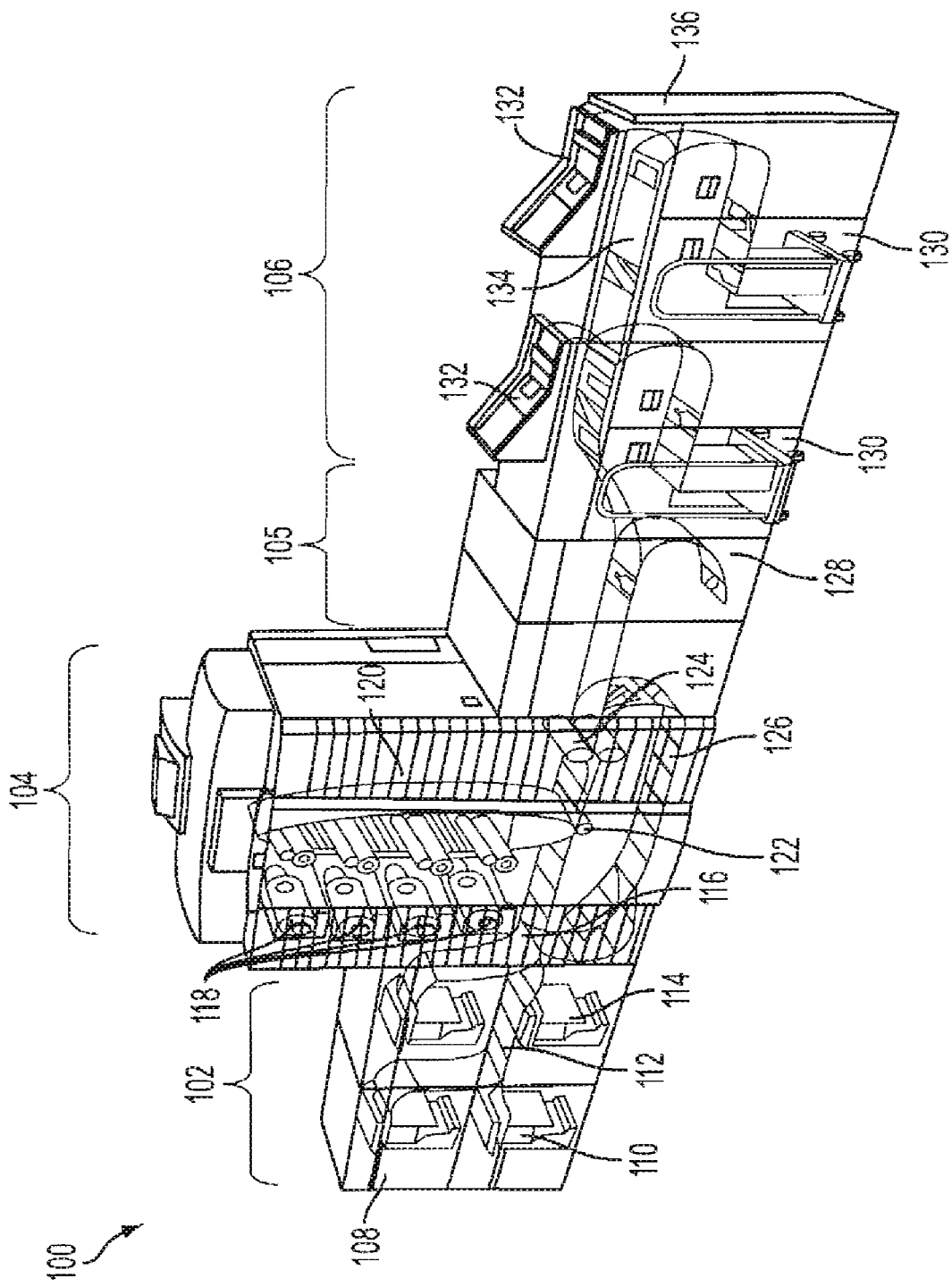
FIG. 1 illustrates a block diagram of an exemplary embodiment of a printing system for performing an exemplary embodiment of method of an intermediate job termination response.

FIG. 1 illustrates a block diagram of an exemplary embodiment of a printing system for performing an exemplary embodiment of method of an intermediate job termination response. Exemplary embodiments may be performed on many different kinds of xerographic systems, such as printers, copiers, scanners, etc. of which FIG. 1 illustrates one, namely a digital production press 100. This digital production press 100 is capable of making over 5,000 letter-size paper sheet impressions per hour with a workflow varying from remote job submission to proofing to printing on demand for color images, graphics, and text on a wide array of stocks.

The digital production press 100 includes a feeding mechanism (feeder) 102, a marking engine (marker) 104, an output module 105 and a stacker 106. The feeding mechanism 102 includes two feeder modules 110, each module having a transport mechanism 112 and two paper trays 114. The marking engine 104 includes a straight paper path with optical guides 116, several dry ink (toner) containers 118, a photoreceptor 120, a single-point image transfer to paper 122, a fuser 124, and a duplex path 126. The stacker 106 includes two stackers 130, two top trays 132 for press proof and run-time samples, paper path 134, and an optional document finishing architecture (DFA) for various inline finishing 136 (e.g., booklet maker, square edge, binding, stapling, lamination, and UV coating).

In this example, the fairly long paper path in the printing system 100 goes from the feeding mechanism 102 through the marking engine 104 through the output module 105 to the stacker 106. Stock is taken from the feeding mechanism 102 onto the paper path 116 and images are transferred onto the paper below the photoreceptor 120 on the paper path at 122 near the fuser 124. At this point in the paper path, the paper may continue going straight or loop back around on the duplex path 126. After the fuser 124, the post-process interposer 128, which is sometimes called an inverter, is available to optionally change the orientation of the paper on the paper path. Further down the paper path, paper may move up towards the top tray 132 or down towards one of the stackers 130, or continue on paper path 134 towards the other stacker 130 or optional finishers 136.

The printing system 100 may also include components not shown in FIG. 1. Printing system 100 may also include a print station interface platform (PSIP), which is a processor (e.g., a personal computer) coupled to a print engine in the marking engine 104. The print station interface platform displays any fault messages raised by the print engine and may include diagnostic routines to service the print engine, such as videos for clearing paper jams. The print station interface platform includes a mark facility controller (MFC) that generally controls the overall printing process. The mark facility controller determines which tray the feeding mechanism 102 needs to feed a sheet of paper, informs the marking engine 104 what images to place on the sheet, determines whether the sheet will go through the duplex path for a second image on the other side, determines whether the sheet goes to the top tray 132 or the stacker 130, or to a finishing device 136. In addition, the mark facility controller receives information from a digital front end (DFE), which is another processor (e.g., a personal computer) coupled to the print engine.

The print engine includes the whole image output terminal (IOT) or printing system 100 shown in FIG. 1. The print engine and the print station interface platform (PSIP) together form a print station. The print station may also include the mark facility controller (MFC) and any document finishing architecture (DFA) 136. The print station and the digital front end (DFE) form a system.

Suppose the printing system 100 of FIG. 1 is printing sheet 100 of a large job and at this time, a proof or interrupt job 100 starts to print. As sheet 100 goes through the printing system, sheet 100 moves from the feeder 102 to the marker 104 to put the images on the sheet to the fuser 124 to fuse the image onto the sheet and, then, sheet 100 moves out of the marking engine 104 to come to a final destination in the stacker 130. When sheet 100 comes to rest in the stacker 130, the stacker 130 sends a complete message to the mark facility controller. Similarly, the feeder 102 and the marker 104 may have reported a status to the mark facility controller. Then, the mark facility controller knows that sheet 100 has finished printing. At this point, the first sheet of the proof job may start printing. First, the digital front end sends a message to the mark facility controller indicating that the large job was successfully interrupted and the last sheet printed was sheet 100. The digital front end stores this continuation information in a storage device in order to resume later with the next sheet, sheet 101.

For printing systems with fairly lengthy paper paths, such as printing system 100, when a small job of, say one or two sheets is printing, the rest of the paper path is empty, which causes a pause or delay in printing. The printing system 100 is up, i.e., cycled up (i.e., all the motors are still spinning) and ready to print images, but is not able to feed any sheets of paper and print them until the digital front end and the mark facility controller determine which sheet to print next.

Figure 2:
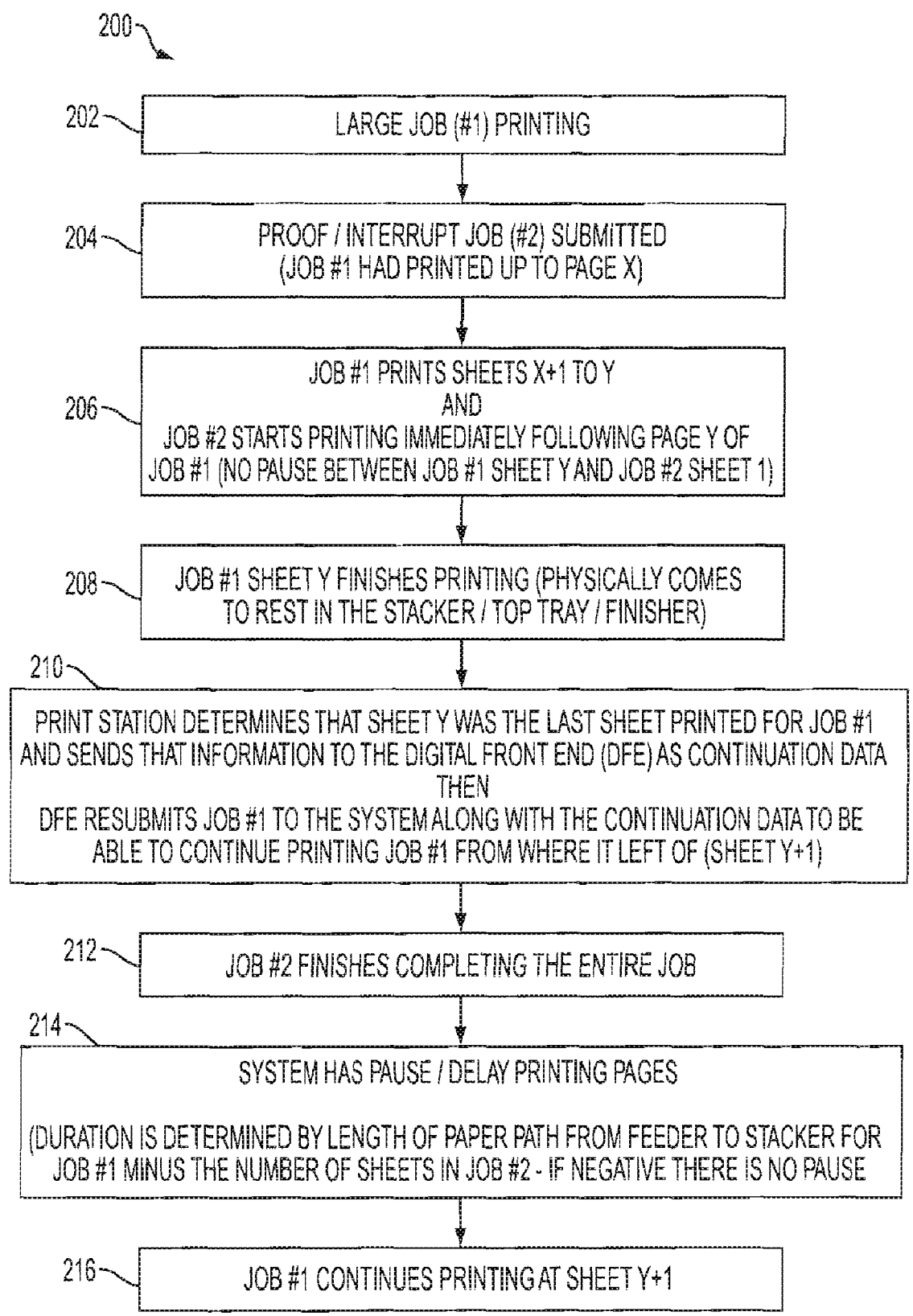
FIG. 2 illustrates a flow chart of a related art method of handling an interrupt job with lost productivity.

FIG. 2 illustrates a related art method 200 of handling an interrupt job with lost productivity. A large job (main job or job #1) is printing at 202 and, then, the user submits a proof job (interrupt job or job #2) at a time when the large job just happened to have printed up to sheet X at 204. The large job continues to print sheets X+1 to Y and the proof job starts printing following sheet Y so that there is no interruption in the printing process at 206. The printing system is following the rhythmic pattern of printing every sheet in each pitch possible. Then, the large job finishes printing the last sheet before starting the proof job, i.e., sheet Y, which comes to rest in the stacker, top tray or finisher at 208. At this point, the print station (or mark facility controller) determines that sheet Y was the last sheet printed for the large job and sends that information to the digital front end as the continuation data at 210. Then, the digital front end resubmits the large job with the continuation data so that the printing system is able to resume printing the large job from where it left off, i.e., at sheet Y+1 at 210. The proof job finishes at 212. At this point the printing system has a pause or delay in printing sheets at 214. The duration of the delay is determined by the length of the paper path from the feeder to the stacker for the large job minus the number of sheets in the proof job. If this calculation is negative, then there is no pause. Then, the large job resumes printing at sheet Y+1 at 216.

Figure 3:
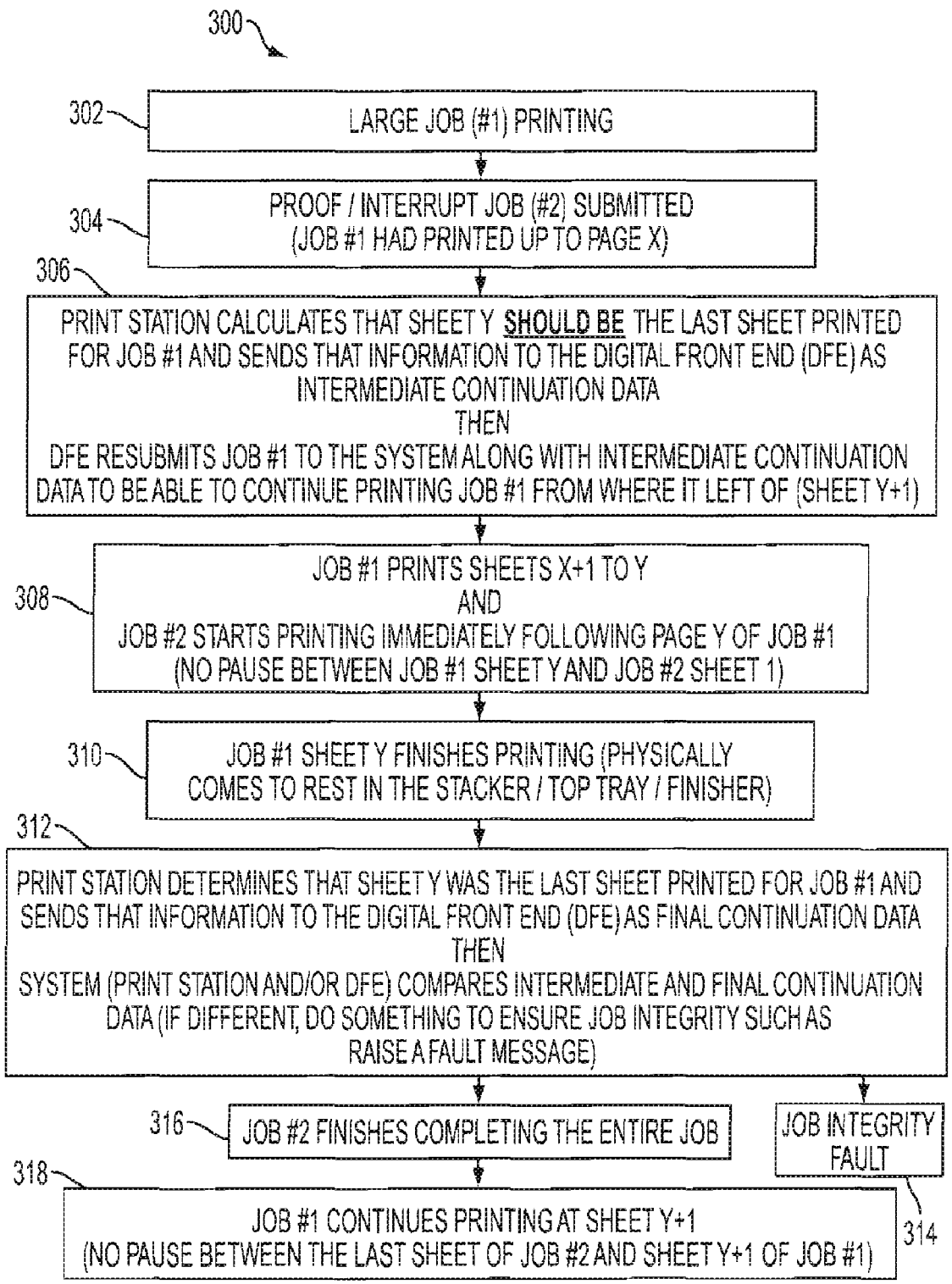
FIG. 3 illustrates a flow chart of an exemplary embodiment of method of an intermediate job termination response that allows better productivity.

FIG. 3 illustrates an exemplary embodiment of method of an intermediate job termination response that allows better productivity than that of FIG. 2. In the same situation, i.e., a large job is printing at 302 and a proof job is submitted at the point where the large job had already printed up to sheet X at 304, but the method of the intermediate job termination response is different. The print station calculates that sheet Y should be the last sheet printed for the large job (i.e., the expected termination point) and sends that information to the digital front end as intermediate continuation data at 306. Then, the digital front end resubmits the large job along with the intermediate continuation data to enable the printing system to continue printing the large job from where it left off, i.e., at sheet Y+1 at 306. Similar to FIG. 2, The large job continues to print sheets X+1 to Y and the proof job starts printing following sheet Y so that there is no interruption in the printing process at 308 and the large job finishes printing and physically comes to rest in the stacker, top tray or finisher at 310. The print station (or mark facility controller) determines that sheet Y was the last sheet printed for the large job and sends that information to the digital front end as final continuation data at 312. Then, the print station (and/or the digital front end) compares the intermediate and final continuation data at 312. If they are different, then the printing system performs an action (reconciliation) to ensure job integrity, such as raising a fault message at 314. The proof job finishes at 316. The large job resumes printing at sheet Y+1 with no pause between the last sheet of the proof job and sheet Y+1 of the large job.

In FIG. 2, the mark facility controller does not send a message to the digital front end until the last sheet of a completed job hits the stacker 130, which is too late for the digital front end to have provided information to make sure that the paper path was full. In FIG. 3, at the point in time when a proof job is requested, the mark facility controller sends a notification to the digital front end with an estimate of the last sheet of the currently printing large job to end (e.g., sheet 100) called an intermediate termination. The last sheet is not confirmed, but is a tentative point where the large job may stop printing to allow the proof job to print. This intermediate termination helps the digital front end plan to send a job, i.e., that if the printing system 100 stops the large job at 100, then it will resume at sheet 101. The intermediate termination data is stored by the digital front end.

In FIG. 2, continuation data is sent at the point in time when the sheet is physically done moving through the paper path. Because the paper path is long, if information isn't available until a sheet physically stops moving in the printing system 100, then in order to have had another sheet of paper already moving through the paper path, it is necessary to start the new sheet of paper before the point in time when the last sheet of the interrupted job stopped moving. This is why some printing systems have a gap or delay in printing for job interrupts that may cause lost productivity.

Having the needed information at the right time is important for smooth job interrupt handling in FIG. 3. The digital front end needs to plan how to resubmit the large interrupted job before the small proof job completes so that the interrupted job can resume right after the proof job is complete. In FIG. 2, this cannot physically happen because the digital front end lacks information about where the large interrupted job stopped printing. This information is lacking because the digital front end does not know the last sheet completed for the large interrupted job until the last sheet physically comes to rest in the system. At that point, it is too late for the digital front end to send job data to the mark facility controller to continue printing. Thus, productivity is lost while the paper path has empty slots.

To solve the lost productivity problem in FIG. 3, a forecast is made for the last sheet of the large interrupted job and this forecast is given to the digital front end so that the digital front end can use this forecast to resubmit the large interrupted job so that the system can get back to the mark facility controller in time to keep the paper path full.

Internal to the print engine, various messages are sent to control how paper is moving through the paper path. The mark facility controller has to receive information so that it can compile where the large interrupted job left off and then send that information to the digital front end. The digital front end needs to receive information to be able to resubmit the large interrupted job from the point it left off.

In the sheet 100 example, sheet 100 is scheduled as the last sheet to be printed before the interrupt job is started, As sheet 96 of the large job is printing, suppose there is a paper jam. One embodiment includes a way to detect this occurrence and change the timing of the scheduled job interrupt. In conventional systems, because the mark facility controller does not tell the digital front end where it left off until the mark facility controller actually knows the last sheet was printed, the mark facility controller may negotiate with the digital front end and either continue printing sheets 96-100 or interrupt the large job after sheet 95, when the machine cycles back up after clearing the jam.

In an exemplary embodiment, options also exist when something happens to stop a large job before the scheduled last sheet. In addition to the intermediate information and continuation data, a final continuation data message may be sent. The final continuation data is sent to maintain job integrity, so that no sheets are repeated or skipped.

The photoreceptor 120 in the exemplary printing system 100 of FIG. 1 has eleven pitch modes, or enough room to fit eleven 8½×11 inch pieces of paper in the print path at a time. Each pitch is an opportunity or room available to print a sheet. Pitches may be skipped if, for example, there was no data to print at a particular point in time or the print engine was performing some xerographic adjustments. In this example, the printing system 100 of FIG. 1 provides 110 opportunities per minute to print a sheet. If, for example, during the course of a minute, only 109 sheets were printed instead of 110, one pitch was skipped. It is possible to hear a skipped pitch during printing as a silence or long pause in the rhythm of printing (e.g., chink, chink, chink, chink, (silence), chink, chink, chink, chink). One advantage of exemplary embodiments is less skipped pitches.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of intermediate job termination, comprising:
submitting a main print job to a print station;
submitting an interrupt job to the print station;
calculating an expected termination point of the main job, upon submission of the interrupt job;
resubmitting the main job together with the expected termination point to the print station such that the interrupt job starts printing at a sheet immediately following the expected termination point;
printing the main job up to the expected termination point;
printing an entirety of the interrupt job immediately following printing of the expected termination point; and
resuming printing the main job at a next sheet of the main job immediately after the expected termination point, the resuming printing of the main job following a last sheet of the interrupt job, without interrupting a rhythmic pattern of printing between the last sheet of the interrupt job and the next sheet of the main job, such that an entirety of the main job and an entirety of the interrupt job are printed with no skipped pitches.

2. The method of claim 1, wherein there are no skipped pitches between the last sheet of the interrupt job and the sheet immediately following the expected termination point of the main job.

3. The method of claim 1, wherein the print station calculates the expected termination point of the main job.

4. The method of claim 3, wherein the print station sends the expected termination point of the main job as intermediate continuation data to a digital front end.

5. The method of claim 4, wherein the print station sends the actual termination point as final continuation data to the digital front end.

6. The method of claim 4, wherein the digital front end receives the expected termination point of the main job, before the main job reaches the expected termination point.

7. The method of claim 1, further comprising:
comparing an actual termination point with the expected termination point; and
raising a fault message, if the actual termination point differs from the expected termination point.

8. The method of claim 7, wherein the print station compares the actual termination point with the expected termination point.

9. A non-transitory computer-readable medium storing instructions for a computer to perform a method of intermediate job termination, the method comprising:
calculating an expected termination point of a submitted main job, after submission of a interrupt job;
resubmitting the main job together with the expected termination point such that the interrupt job starts printing at a sheet immediately following the expected termination point;
printing the main job up to the expected termination point;
printing an entirety of the interrupt job immediately following printing of the expected termination point; and
resuming printing the main job at a next sheet of the main job immediately after the expected termination point, the resuming printing of the main job following a last sheet of the interrupt job, without interrupting a rhythmic pattern of printing between the last sheet of the interrupt job and the next sheet of the main job, such that an entirety of the main job and an entirety of the interrupt job are printed with no skipped pitches.

10. The computer-readable medium of claim 9, wherein there are no skipped pitches between the last sheet of the interrupt job and the sheet immediately following the expected termination point of the main job.

11. The computer-readable medium of claim 9, wherein a print station calculates the expected termination point of the main job.

12. The computer-readable medium of claim 11, wherein the print station sends the expected termination point of the main job as intermediate continuation data to a digital front end.

13. The computer-readable medium of claim 12, wherein the print station sends the actual termination point as final continuation data to the digital front end.

14. The computer-readable medium of claim 12, wherein the digital front end receives the expected termination point of the main job, before the main job reaches the expected termination point.

15. The computer-readable medium of claim 9, further comprising:
comparing an actual termination point with the expected termination point; and
raising a fault message, if the actual termination point differs from the expected termination point.

16. The computer-readable medium of claim 9, wherein the print station compares the actual termination point with the expected termination point.

17. A xerographic machine, comprising:
a print station for receiving a main job and an interrupt job;
wherein the print station calculates an expected termination point of the main job, upon submission of the interrupt job;
wherein the main job together with the expected termination point are resubmitted such that the interrupt job starts printing at a sheet immediately following the expected termination point;
a printer that prints the main job up to the expected termination point;
wherein the printer prints an entirety of the interrupt job immediately following printing of the expected termination point; and
the printer resumes printing the main job at a next sheet of the main job immediately after the expected termination point, the resuming printing of the main job following a last sheet of the interrupt job, without interrupting the rhythmic pattern of printing between the last sheet of the interrupt job and the next sheet of the main job, such that an entirety of the main job and an entirety of the interrupt job are printed with no skipped pitches.

18. The xerographic machine of claim 17, wherein the print station compares an actual termination point with the expected termination point.

19. The xerographic machine of claim 18, wherein a fault message is raised, if the actual termination point differs from the expected termination point.

* * * * *